UNITED STATES PATENT OFFICE.

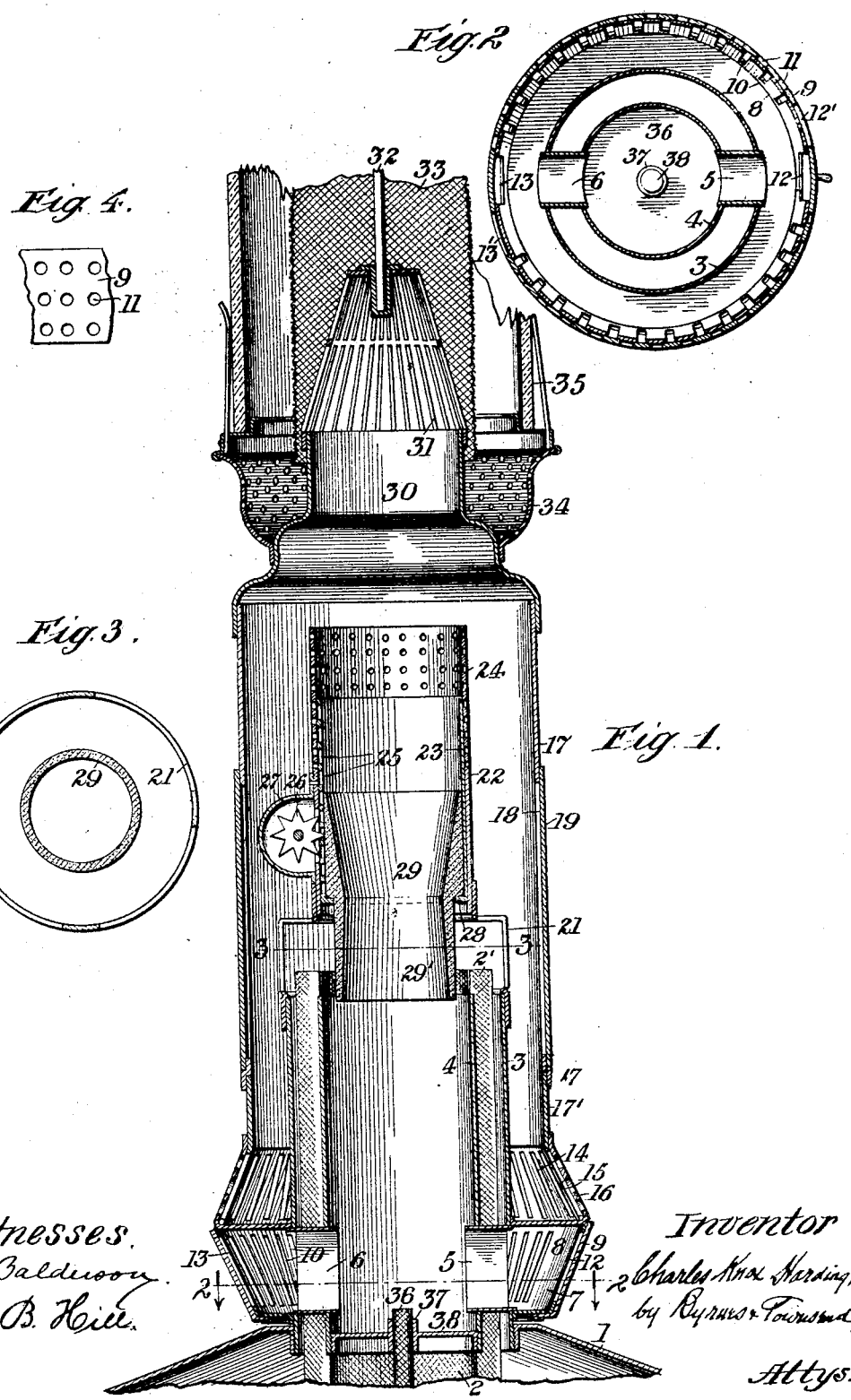

CHARLES KNOX HARDING, OF CHICAGO, ILLINOIS.

PROCESS AND APPARATUS FOR PRODUCING COMBUSTIBLE GAS MIXTURES.

No. 803,534.     Specification of Letters Patent.     Patented Oct. 31, 1905.

Application filed December 6, 1904. Serial No. 235,734.

*To all whom it may concern:*

Be it known that I, CHARLES KNOX HARDING, a citizen of the United States, residing at Chicago, in the county of Cook and State of Illinois, have invented certain new and useful Improvements in Processes and Apparatus for Producing Combustible Gas Mixtures, of which the following is a specification.

According to this invention, a combustible liquid, especially a mixture of hydrocarbons of different boiling-points, such as kerosene, is vaporized by feeding the liquid to a surface in proximity to a heated body of a catalytic agent—for example, platinized tripoli. The vapor is then mixed with air, and the mixture is passed over the catalytic body, thereby effecting partial combustion of the vapor and supplying heat to maintain the temperature of the catalytic agent. The gaseous mixture is also chemically modified by the catalytic agent, the unburned hydrocarbons being partially split up and oxidized into simpler and more volatile bodies or oxidized derivatives of the methane series, the product being a homogeneous mixture of gas and air of less density and calorific value, but greater volume, than the original mixture. The gas mixture can be burned for various purposes and employed in explosion-engines, but is especially useful for heating incandescence-mantles.

The accompanying drawings illustrate one form of apparatus for utilizing the invention—to wit, a lamp for vaporizing kerosene and burning the vapor to heat an incandescence-mantle.

In the drawings, Figure 1 is an axial section of the lamp, a portion of the oil-reservoir, chimney, and mantle being broken away. Fig. 2 is a horizontal section on the line 2 2 of Fig. 1. Fig. 3 is a horizontal section on the line 3 3 of Fig. 1, and Fig. 4 is a side elevation of a portion of one of the air-control rings.

The lamp illustrated has an oil-reservoir 1, into which is screwed a unit comprising the wick-tubes, air-supply chambers and casing, vaporizer, and burner. The two-part wick 2 is adjustably supported between concentric tubes 3 4. Horizontal ports 5 6 extend through the lower ends of the wick-tubes. Surrounding the lower ends of the wick-tubes and inclosing the air-ports 5 6 is an air-supply chamber 7, having an outer wall consisting of an inner fixed ring 8 and an outer revoluble ring 9. The inner ring has an annular series of vertical air-slots 10, and the outer ring has numerous air-holes 11. The rings 8 9 also have larger openings 12 12' and 13 13' to give access to the ports 5 6. A regulated and diffused current of air is thus supplied to the space within the wick. Above the chamber 7 is another air-supply chamber 14, also having an outer wall consisting of a vertically-apertured fixed inner ring 15 and a finely-perforated revoluble outer ring 16. Integral with and rising from the inner ring 15 is a tubular casing 17 17', which surrounds the vaporizer and carries the burner. This casing has large vertical openings 18, controlled by a revoluble outer ring 19 with vertical openings. The main upper portion 17 of the casing is removably seated upon the lower portion 17'.

Removably supported on the upper end of the outer wick-tube 3 is a grid 21, which carries a fixed outer tube 22 and a vertically-adjustable inner tube 23. The upper half of the outer tube has numerous small holes 24. The inner tube has a vertical series of short slots 25 in position to receive the teeth of a star-wheel 26, which is revolubly supported in a housing 27, secured to the outer tube. The lower end 28 of the inner tube is inwardly flanged and supports a shouldered ring 29, the lower portion 29' of which projects below the tubes 22 23 and faces the exposed upper end 2' of the wick. The ring 29 consists of or carries the catalytic agent and may consist of tripoli impregnated with finely-divided platinum or a metal of the platinum group.

Supported upon the upper end of the casing 17 is an incandescence-burner, which may be of any approved type. That shown comprises a gas-delivery passage 30, upon the upper end of which is a frusto-conical distributer 31, which in turn carries a refractory support 32 for the mantle 33. Surrounding the gas-passage 30 is a perforated ring 34, which supports the chimney 35.

To bring the lamp into operation, the catalytic body 29 must be initially heated. The heating means shown is a small central wick 36, passing through an opening 37 in a disk 38, which is screwed into the lower end of the wick-tube 4.

To start the lamp, the reservoir 1 is filled with the combustible liquid—for example, kerosene of high flash-point. The oil in the wick 36 is then lighted by a match introduced through the ports 12' 12 5 or 13' 13 6. The catalytic body 29 is thus quickly raised to a temperature sufficient to effect vaporization, but insufficient to ignite the vapor, and the heat radiated from its lower end 29' to the exposed upper end 2' of the wick vaporizes the oil in the latter. By reason of the small area of the wick-surface which is exposed to the heat from the ring 29, the inner tube 4 acting as a shield, an oil containing hydrocarbons of different boiling-points may be quickly and completely vaporized. The control-ring 16 is now adjusted, and air enters the chamber 14, rises and mixes with the oil-vapor, and the mixture passes down between the upper end of the wick and the lower end of the ring 29 and thence upward through the ring. As the mixture rises in contact with the inner surface of the ring it is chemically modified and transformed into a light and comparatively stable gas, the volume of the mixture being increased, while its calorific value is correspondingly decreased. This result is believed to be due to a partial oxidation and decomposition of the various hydrocarbons in the oil into simpler and more volatile bodies of the methane series or their oxidized derivatives. The partial combustion of the vapor maintains the contact-ring at its original temperature, so that oil is continuously vaporized from the upper end of the wick. The lower control-ring 9 is now adjusted, and air passes into the supply-chamber 8 and through the ports 5 6 into the inner wick-tube, wherein it rises and mingles with the gas mixture. The air-ports opening into the chambers 8 and 14 are of sufficient combined area to supply more air than is required by the lamp. In use the rings 9 16 are adjusted to partially close the openings. Adjustment of the lower ring, which gives a direct air-inlet, correspondingly varies the amount and velocity of air which enters through the upper ring. The finished product is then delivered through the passage 30 and burned to heat the incandescence-mantle.

The gaseous product can be burned in any ordinary burner and is suitable for use in explosion-engines. It is especially suitable for heating incandescence-mantles, on account of the preliminary oxidation, increased volume and decreased thermal value of the vapor, and its intimate mixture with air. The gas largely burns in contact with the mantle, thus giving the maximum temperature and furnishing heat directly to the thorium and cerium compounds in the mantle, by the alternate reduction and reoxidation of which the necessary temperature is maintained. There is relatively little combustion in the space within and at the lower end of the mantle, whereas a heavy hydrocarbon vapor largely burns with a flame of lower temperature than that of the mantle as soon as it is delivered, thus actually cooling the mantle. Furthermore, the large complex molecules of a heavy hydrocarbon vapor are not readily and quickly oxidized in contact with the mantle. The use of a vaporizer which is separately heated by the partial initial combustion of the vapor enables all of the heat evolved by the final combustion of the product to be directly employed for heating the mantle, as distinguished from the usual hydrocarbon-lamp, in which heat is transmitted from the burner to the vaporizer. The temperature of the contact-ring also assists in producing a draft to carry the oil-vapor and air upward to the burner.

While the invention has been described in connection with an incandescence kerosene-lamp, it is obvious that it may be embodied in apparatus of widely-different construction. The oil may be fed by other means than a wick, and the vaporizing-surface may be other than the upper end of the wick. Any approved catalytic agent which will effect partial combustion of the initial mixture may be employed. Any mixture of a gaseous hydrocarbon and air may be chemically modified by contact with the catalytic agent to produce a light homogeneous gas for use with incandescence-mantles.

I claim—

1. The process of burning liquid hydrocarbons, which consists in vaporizing the hydrocarbon, mixing the vapor with air, passing the mixture in contact with a catalytic agent without effecting ignition, and subsequently burning the product, as set forth.

2. The process of burning petroleum, which consists in vaporizing the petroleum, mixing the vapor with air, passing the mixture in contact with a catalytic agent without effecting ignition, and subsequently burning the product, as set forth.

3. The process of vaporizing and burning liquid hydrocarbons, which consists in placing a catalytic agent in proximity to a vaporizing-surface, initially heating said catalytic agent, supplying the hydrocarbon to said surface and vaporizing it by the heat from said catalytic agent, mixing the vapor with air and passing the mixture in contact with said catalytic agent, thereby effecting partial combustion of said mixture and maintaining the temperature of said catalytic agent, and burning the product, as set forth.

4. The process of vaporizing and burning liquid mixtures of hydrocarbons of different boiling-points, which consists in placing a catalytic agent in proximity to a vaporizing-surface, initially heating said catalytic agent, supplying the liquid to said surface, localizing the heat from the catalytic agent to a limited portion of said surface and thereby quickly vaporizing portions of the entire liquid, mixing the vapor with air and passing the mixture in contact with said catalytic agent, thereby effecting partial combustion of said mixture and maintaining the temperature of said catalytic agent, and burning the product, as set forth.

5. A generator for producing a combustible gas mixture, containing a vaporizer, means for mixing the vapor with air, and a catalytic body in position to act by contact on the mixture, as set forth.

6. An apparatus for producing and burning a combustible gas mixture, comprising a vaporizer, means for mixing the vapor with air, a catalytic body in position to act on the mixture, and a burner, as set forth.

7. An apparatus for producing a combustible gas mixture, comprising a vaporizing-surface, means for feeding a combustible liquid to said surface, a catalytic body in proximity to said surface, means for mixing the vapor with air, and means for passing the mixture in contact with said catalytic body, as set forth.

8. An apparatus for producing and burning a combustible gas mixture, comprising a vaporizing-surface, means for feeding a combustible liquid to said surface, a catalytic body in proximity to said surface, means for mixing the vapor with air, means for passing the mixture in contact with said catalytic body, and a burner, as set forth.

9. An apparatus for producing and burning a combustible gas mixture, comprising a vaporizing-surface, means for feeding a combustible liquid to said surface, a catalytic body in proximity to said surface, a shield for limiting the heated portion of said surface, means for mixing the vapor with air, means for passing the mixture in contact with said catalytic body, and a burner, as set forth.

10. An apparatus for producing and burning a combustible gas mixture, comprising a vaporizing-surface, means for feeding a combustible liquid to said surface, a catalytic body in proximity to said surface, a shield for limiting the heated portion of said surface, means for supplying separate regulated amounts of air to said vaporizing-surface and to the primary mixture of vapor and air, means for passing the mixture in contact with said catalytic body, and a burner, as set forth.

In testimony whereof I affix my signature in presence of two witnesses.

CHARLES KNOX HARDING.

Witnesses:
WILLIAM B. WALRATH,
ROBERT L. LANE.